C. E. JACK.
CENTERING DEVICE FOR MECHANICS' TURNING LATHES.
APPLICATION FILED DEC. 1, 1910.
1,000,914.
Patented Aug. 15, 1911.
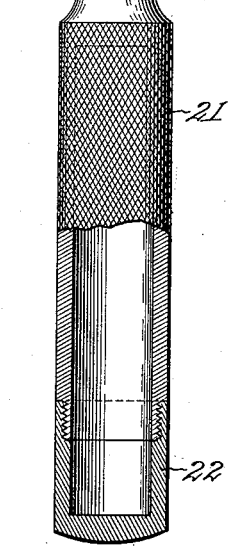
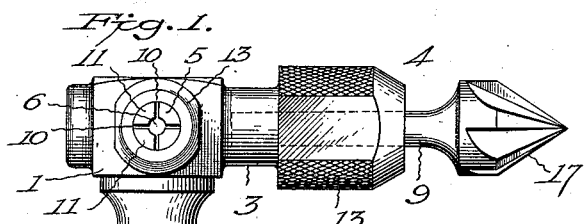
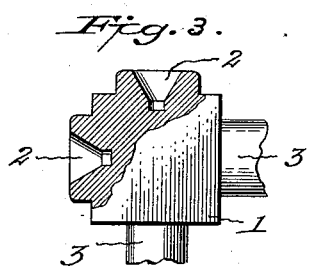

UNITED STATES PATENT OFFICE.

CLARENCE E. JACK, OF LOUVIERS, COLORADO.

CENTERING DEVICE FOR MECHANICS' TURNING-LATHES.

1,000,914.    Specification of Letters Patent.    Patented Aug. 15, 1911.

Application filed December 1, 1910. Serial No. 595,163.

*To all whom it may concern:*

Be it known that I, CLARENCE E. JACK, a citizen of the United States of America, residing at Louviers, county of Douglas, and State of Colorado, have invented a new and useful Centering Device for Mechanics' Turning-Lathes, of which the following is a specification.

My invention relates to improvements in centering devices for mechanics' metal turning lathes, and the objects of my invention are: first, to provide a hand grasping device that is adapted to hold work centering lathe tools; and second, to provide a centering device for use in a lathe and that is provided with a plurality of tool receiving apertures in which lathe tools such as drills and countersinks of different sizes and with shanks of different forms can be interchangeably held. I attain these objects by the mechanism illustrated in the accompanying drawings, in which:

Figure 1 is a side elevation of a hand grasping centering tool embodying my invention. Fig. 2 is a plan view of the centering tool. Fig. 3 is a fragmentary plan view of Fig. 2, showing a section through the countersunk center aperture of the centering tool.

Similar letters of reference refer to similar parts throughout the several views.

Referring to the drawings, the numeral 1 designates a block of any suitable metal, preferably steel. This block I term the head block of my centering device. It may be either square, hexagonal or of other suitable polygonal form. I have illustrated head blocks of square and hexagonal form, as embodying the most suitable forms of my invention. The opposite sides of these square and hexagonal heads are flat and parallel with each other, and one side of each pair of oppositely arranged sides is provided at its center with a conical countersunk central aperture 2, and the opposite sides of each pair of sides from the countersunk side are each provided with a projecting stem portion 3. These stem portions are arranged and adapted to form receivers for tools of different sizes used for lathe work, and they may be arranged to receive tools of different kinds. Thus their outer ends may be all arranged and formed into a tool holding chuck, as shown at 4 and 5. When it is desired to provide these ends with a chuck, the outer end of the stem is provided with a straight axial longitudinal aperture 6 to receive the shank portion 9 of the tools, and the end of the stem is also provided with two diametrically arranged radial slots 10 that extend through each stem, which separate the end of the stem into fingers 11 that can be sprung into the axial aperture in its end. The terminal end portion is also pointedly tapered by a converging tapered portion 12, and each stem is provided with a threaded portion adjacent to its tapered end portion.

A chuck sleeve 13 is provided with an interior thread at one end and is threaded onto the threaded part of the stems. The sleeve is provided at its outer end portion with an interior, convergingly tapering wall 14, that fits over and engages the taper ends of the stems, and the chuck sleeves are adapted to be screwed onto the stems and to spring the separated ends of the stems concentrically together.

At the junction of the inner threaded wall of the chuck sleeve with its conical, converging end portion a circumferential recess 15 is formed that forms a clearance space between the thread and the taper wall, and the stem is provided with a flat band portion 16 between the inner end of its taper end portion and the beginning of its threaded portion that is positioned substantially opposite to the recess 15 in the sleeve when the chuck end of the stem is in an open position. In Figs. 1 and 2 I illustrate a countersink tool 17 in these chuck stems, and when a tool is placed in the axial aperture of the stem and the chuck sleeve is screwed tightly on the stem the shank of the tool is grasped and tightly held by the contracting movement of the ends of the stem which are forced against the tool by the chuck sleeve.

I preferably employ a chuck on the ends of the stems, as it will grip and hold the shanks of tools that vary quite a little in size.

A drift key transverse keyway 20 is made through the stem at the rear end of the taper aperture, in which a drift key, which I do not illustrate, is placed when it is desired to dislodge a drill from the stem that sticks therein.

In Fig. 2 I illustrate a tool with two chuck stems. The axial apertures in each stem are arranged in axial alinement with the countersunk central apertures diametrically opposite to it on the opposite side of the head block. These tool holding stems may be arranged at right angles to each other or at the angles of the opposite sides of a hexagonal headed block, and where two chuck stems are made their drill receiving apertures are preferably made of different sizes to hold different sizes of tools. To this tool supporting head block I secure a handle 21, which is preferably made hollow and is in one piece with the head block. Over its lower end I preferably place a cap 22, which may be secured to it in any suitable manner, preferably by threading the cap to the end of the handle. The handle is made long enough to be firmly grasped by one hand of an operator, and its outside surface is preferably knurled. The outside surfaces of the round chuck sleeves are also preferably knurled to provide a roughened hand gripping surface, as shown in Fig. 2 and Fig. 3, but this knurled surface is not needed when these sleeves are provided with a hexagonal or other wrench receiving surface.

The operation of my improved centering device is as follows: Having properly inserted such tools as it is desired to use in the chucks and stems of the head block, the operator places the center aperture of the tool he desires to use on the center of the lathe and holds the center of the drill or countersink against the piece of work he desires to apply the tools to, and, assuming he wants to drill a center hole in a piece of work that is held in a chuck that is mounted on a lathe, he turns the drill of the centering tool against the work and feeds it into the work by feeding forward the spindle of the lathe until the tool penetrates the work to the desired depth. He then runs the spindle back and takes the centering tool off of the center of the lathe and turns it far enough to put the central aperture of the countersink tool 17 onto the center of the lathe and then feeds the spindle of the lathe forward and inserts the point of the countersink into the center hole he has drilled and countersinks it out to form as large a conical centering receiving aperture as desired.

My invention is simple, and, while I have illustrated the preferred construction and arrangement of it, various changes within the scope of my claims might be made without departing from my invention.

Having described my invention, what I claim as new and desire to secure by Letters Patent is:

1. A centering tool comprising a suitable block portion having oppositely and parallelly arranged side surfaces, a stem projecting from one side and provided with a centering tool holding chuck portion at its outer end, and a countersunk taper center receiving aperture in the opposite side portion of said block from said stem and in axial alinement therewith, said block being provided with a hand grasping handle projecting from said block.

2. In a centering lathe tool, the combination of a handle having a block formed at one end provided with oppositely and parallelly arranged flat side surfaces, said flat surfaces standing at a predetermined angle to each other, and those adjacent to each other on one side portion of said block being provided with center receiving apertures and those opposite to these center containing apertures being provided with projecting stem portions containing axial apertures in axial alinement with said center receiving apertures, and means connected with said stem's axial apertures for holding the shank ends of center forming tools in said stems against rotation.

In testimony that I claim the foregoing as my own, I have hereto affixed my signature in the presence of two witnesses.

C. E. JACK.

Witnesses:
JEROME PERRY,
ADOLPH FULMER.